United States Patent [19]

Herold

[11] Patent Number: 5,699,245

[45] Date of Patent: Dec. 16, 1997

[54] DISTRIBUTED LIGHTNING DETECTION SYSTEM

[75] Inventor: David George Herold, Powell, Ohio

[73] Assignee: BFGoodrich Flightsystems, Inc., Richfield, Ohio

[21] Appl. No.: 526,624

[22] Filed: Sep. 11, 1995

[51] Int. Cl.$^6$ .................................................. G06F 169/00
[52] U.S. Cl. ................................................................ 364/420
[58] Field of Search ........................ 364/420; 342/72, 342/72.5, 460; 395/931, 930

[56] References Cited

U.S. PATENT DOCUMENTS

| | | |
|---|---|---|
| 1,759,938 | 5/1930 | Dean . |
| 2,402,688 | 6/1946 | Skurnick . |
| 2,864,081 | 12/1958 | Steelman . |
| 2,953,020 | 9/1960 | Hunt . |
| 3,369,240 | 2/1968 | Leary . |
| 3,680,121 | 7/1972 | Anderson et al. . |
| 3,705,404 | 12/1972 | Chisholm . |
| 3,750,178 | 7/1973 | Hulst . |
| 3,848,254 | 11/1974 | Drebinger et al. . |
| 3,886,553 | 5/1975 | Bates . |
| 3,940,700 | 2/1976 | Fischer . |
| 4,023,408 | 5/1977 | Ryan et al. . |
| 4,115,732 | 9/1978 | Krider et al. . |
| 4,198,599 | 4/1980 | Krider et al. . |
| 4,245,190 | 1/1981 | Krider et al. . |
| 4,395,906 | 8/1983 | Ryan et al. . |
| 4,543,580 | 9/1985 | Bent et al. . |
| 4,792,806 | 12/1988 | Bent et al. . |
| 4,806,851 | 2/1989 | Krider et al. . |
| 4,841,305 | 6/1989 | Richard et al. ................ 342/460 |
| 4,870,422 | 9/1989 | Counselman, III . |
| 4,914,444 | 4/1990 | Pifer et al. .................... 342/460 |
| 5,235,341 | 8/1993 | Effland et al. . |
| 5,325,299 | 6/1994 | Moses et al. . |
| 5,331,330 | 7/1994 | Susnjara ........................ 342/460 |

*Primary Examiner*—Donald E. McElheny, Jr.
*Attorney, Agent, or Firm*—William E. Zitelli

[57] ABSTRACT

A distributed lightning detection system comprises a plurality of lightning detection stations located at different positions with respect to a common frame of reference with the position of at least one detection station being mobile with respect to the common frame of reference. Each station includes a lightning strike detector, first and second receivers, a processor, and a transmitter. The first receiver receives signals from at least one common transmitting system, preferably the GPS system, for establishing a common lightning position and occurrence time frame of references for all of the stations. The processor is governed by a strike indication signal generated by the detector and determines the time of occurrence of the detected lightning strike and the station's own position corresponding thereto. The processor is further operative to generate a report for each detected strike including data of time of occurrence, station's own position and a bearing signal from the detector corresponding to each strike. The bearing signal of the mobile stations being compensated for the station's mobility. The transmitter transmits the strike reports over a data link to other lightning detection stations. The second receiver receives the strike reports from other lightning detection stations over the data link and provides same to the processor. The processor correlates received strike reports with detected strike reports to determine reports generated from common lightning strikes and computes a range from the station to each of the common lightning strikes based on the data of the correlated strike reports corresponding thereto.

43 Claims, 8 Drawing Sheets

| i | TIME | POSITION | BEARING | RANGE | ERROR ELLIPSE |
|---|------|----------|---------|-------|---------------|
| 1 | TIME 1 | POS 1 | B1 | R1 | EE1 |
| 2 | TIME 2 | POS 2 | B2 | R2 | EE2 |
| 3 | TIME 3 | POS 3 | B3 | R3 | EE3 |
| 4 | TIME 4 | POS 4 | B4 | R4 | EE4 |
| • | • | • | • | • | • |
| • | • | • | • | • | • |
| N | TIME N | POS N | BN | RN | EEN |

DISTRIBUTED LIGHTNING DETECTION SYSTEM

BACKGROUND OF THE INVENTION

The present invention is related to lightning strike detection systems, in general, and more particularly to a distributed lightning detection system comprising a plurality of lightning detection stations located at different positions with respect to a common frame of reference with the position of at least one detection station being mobile.

Thunderstorms present a serious threat to mobile craft, such as air and marine craft, for example, as a result of the dangerous turbulence, up and down drafts, wind sheer and other violent atmospheric disturbances generated thereby. It was recognized that electrical discharges or lightning occurred coincidentally with the violent atmospheric disturbances and this strong correlation was used to create a weather mapping instrument for thunderstorm detection and avoidance which is known as the Stormscope® lightning detector and is disclosed in the U.S. Pat. No. 4,023,408 which is currently assigned to the same assignees as the instant application. This instrument may be installed on-board a mobile craft and measures electro-magnetic radiation generated through the atmosphere from the large electric currents flowing within the lightning channel during a lightning strike for the detection thereof. An inverse relationship of the measured radiation is used to map the detected lightning strike on a display in range and bearing relative to an observation location which, for example, may be the location of the mobile craft.

Lightning detection instruments of this variety use crossed looped magnetic sensors and an electric field antenna to accurately determine the bearing from the observation location or mobile craft to the lightning strike. But, estimating range from the craft to the strike relies on the measured strike amplitude. Since lightning strikes have large variances in all parameters, measuring range from a single observation location is subject to large variances when encountering certain storms. Signal processing techniques like those disclosed in U.S. Pat. No. 5,325,299, which is assigned to the same assignee as the instant application, have improved ranging estimates for the detected lightning strikes and such systems have met and continue to meet a significant commercial need. However, further improvements are always desirable.

It is recognized that the fixed, ground based lightning detection networks offer very accurate time and position reporting of lightning strikes for weather mapping and confirmation of weather conditions. In these systems, fixed ground reporting stations transmit their observation data of lightning strikes to a central station which uses triangulation techniques to pinpoint the position of the strike and stores the time and position thereof for future reporting purposes. Common transmitting systems, like the Global Positioning System (GPS), for example, make accurate position and time information continuously available to all such reporting stations.

Applicant has recognized that it is possible to expand the techniques of a ground based lightning detection network to include mobile craft in a distributed system to permit on board, single observation lightning detection station to gather observation data of the same lightning strike from other sources, like the ground reporting stations or even stations on board other mobile craft. Compiling observation data in substantially real time from one or more other sources with the mobile craft's observation data of the same lightning strike will render a more accurate estimation of the range thereto. Uncertainties in the range and bearing estimations may also be improved in the computational techniques. Accordingly, each mobile craft would have the resources of other mobile craft and ground reporting stations in the vicinity thereof to better estimate the position of lightning strikes in substantially real time to avoid areas of severe thunderstorm weather conditions.

SUMMARY OF THE INVENTION

A distributed lightning detection system comprises a plurality of lightning detection stations located at different positions with respect to a common frame of reference with the position of at least one detection station being mobile with respect to the common frame of reference. Each station includes detecting means, first and second receiving means, processing means, and transmitting means. The detecting means detects a lightning strike and provides an indication signal and bearing signal corresponding thereto. The first receiving means receives signals from at least one common transmitting system, preferably the GPS system, for establishing a common time frame for all of the stations and the station's own position with respect to the common frame of reference. The processing means is governed by the indication signal and operatively cooperates with the first receiving means to determine a time of occurrence of the detected lightning strike with respect to the common time frame and the station's own position corresponding to the detected strike. The processing means is further operative to generate a report for each detected strike including data of time of occurrence, station's own position corresponding to the time of occurrence, and bearing signal from the detecting means corresponding to each strike. The transmitting means transmits the strike report of the processing means over a data link to other lightning detection stations. The second receiving means receives the strike reports from other lightning detection stations over the data link and provides same to the processing means. The processing means is operative to correlate received strike reports with detected strike reports to determine reports generated from common lightning strikes and to compute a range from the station to each of the common lightning strikes based on the data of the correlated strike reports corresponding thereto. Each mobile station includes means for compensating the bearing signal of the detected lightning strike according to the mobility of the station corresponding to the time of occurrence of the detected lightning strike to provide a compensated bearing signal which is used by the processing means in correlating the detected and received strike reports.

THE DESCRIPTION OF THE PREFERRED EMBODIMENT

Figure 1:
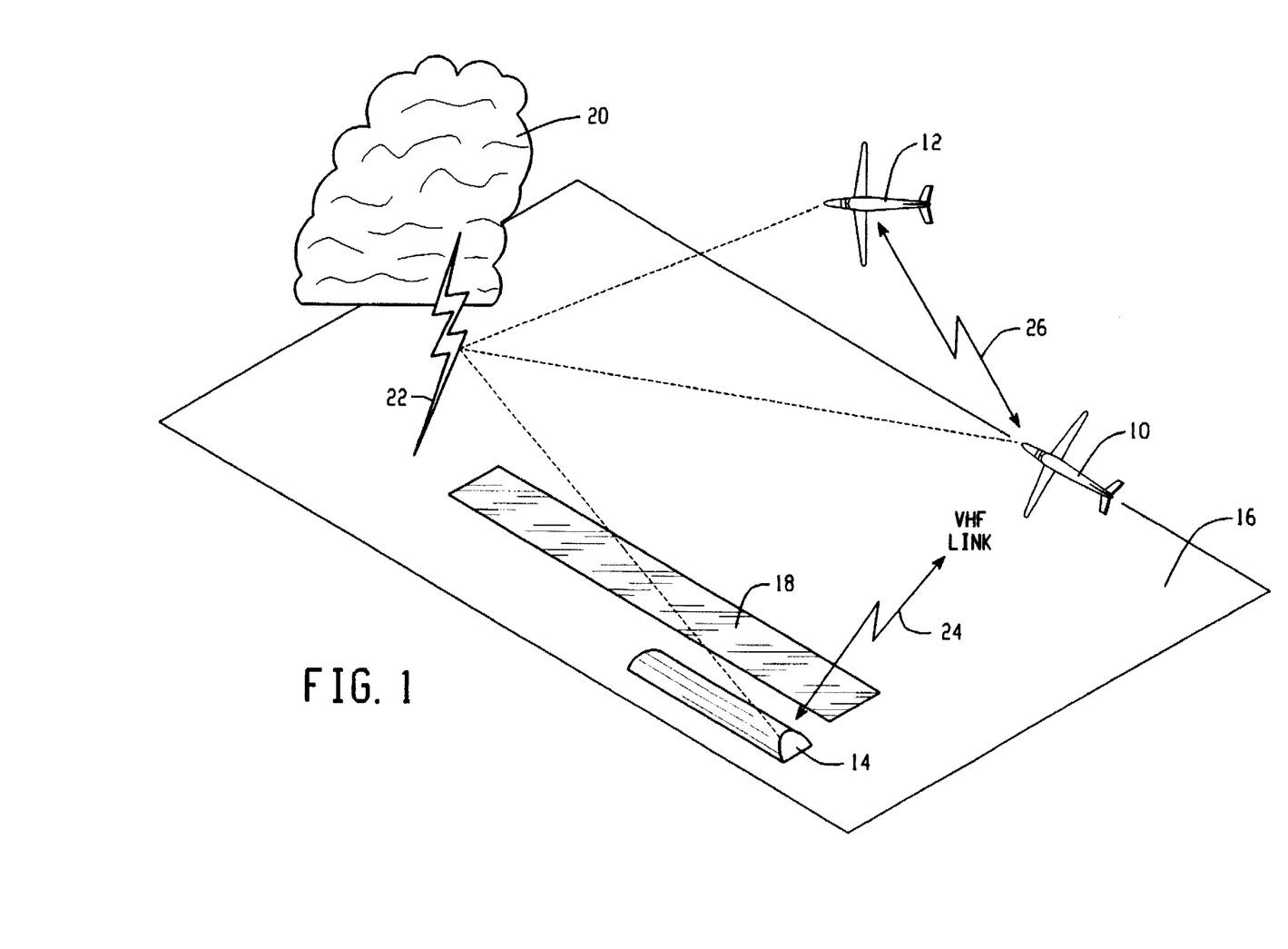
FIG. 1 depicts an exemplary environment suitable for application of an embodiment of the present invention.

FIG. 1 depicts an environment of aircraft flying in the vicinity of an airport under adverse weather conditions of a thunderstorm manifested by lightning strikes. While the mobile craft in this example are aircraft, it is understood that for the present invention, the mobile craft could just as likely be marine craft on a body of water being threatened by similar adverse weather conditions. Accordingly, the invention should not be limited to flying aircraft or marine craft, but should include any mobile craft that requires real time observation data of lightning strikes indicative of weather conditions that may adversely affect the craft.

Also in the example of FIG. 1, at least one ground reporting station is shown at an airport. While this location for a ground based reporting station is advantageous to supplying lightning strike observation data to an approaching aircraft, the present invention should not be so limited. Rather, the distribution system may cover a wide variety of ground reporting station placements spread over wide geographical areas or even bodies of water, for example. In fact, the distributed nature of the present invention allows for observation data to be exchanged between mobile craft for accurately estimating range to a lightning strike notwithstanding a lack of ground reporting stations in the vicinity thereof. Given this understanding then, reference is made to the environment of FIG. 1 by way of example.

In FIG. 1, a plurality of lightning detection stations are shown located respectfully on an aircraft 10, another aircraft 12 and a ground station 14 which are at different positions with respect to a common frame of reference, such as the GPS satellite system. It is understood however that other common transmitting systems, such as the LORAN system, for example, may also be used to establish a common frame of reference. The stations on board the aircraft 10 and 12 are considered mobile with respect to the common frame of reference and the station at 14 is considered non-mobile and geographically fixed with respect to the common frame of reference. The aircraft 10 is depicted as approaching an airfield 16 with a runway 18 and the aircraft 12 is in the vicinity of stations 10 and 14 and airfield 16. In the same vicinity is a thunderstorm 20 and a lightning strike 22 created thereby.

The mobile lightning detection stations of aircraft 10 and 12 and the ground station 14 detect the lightning strike 22 by measuring the electro-magnetic radiation emitted thereby. Certain observation data is collected at each of the stations 10, 12 and 14 as will be more fully explained in the following paragraphs and a data report is created for the strike 22 at each station. In the present example, station 14 transmits its detected strike report data over a data link 24 for reception by other stations, like the mobile stations 10 and 12, in the vicinity thereof. The data link 24 in the present embodiment may be a communication channel of AM transmission over one of the aviation carrier frequencies which range from 118–137 megahertz with 25 kilohertz channel separations. The observation data reports may be digitized and transmitted in a bit serial format using conventional modulation techniques. It is understood however that other communication channels and modulation techniques may be used without deviating from the broad principles of the present invention.

Similarly, stations 10 and 12 may also include transmitters for communicating the detected strike observation data reports therebetween using a similar data link 26 as that of the ground station 14. Each station 10 and 12 employs a conventional receiver for reception of the data reports over the data links 24 and 26. The mobile stations 10 and 12 include a controller which is operative to correlate the received strike reports with detected strike reports to determine reports generated from a common lightning strike, like the strike 22, for example, and to compute a range from each station to the common lightning strike based on the data of the correlated strike reports corresponding thereto which will become more fully understood from the description below.

Of course the observation bearing to the lightning strike 22 as measured by the ground station 14 may be referenced to a common reference bearing, preferably true North, as a result of its fixed, non-mobile position. More specifically, the bearing to the lightning strike 22 is measured using cross loop magnetic sensors and an electrical field antenna (not shown) which at a fixed non-mobile station can be permanently aligned with a reference bearing like true North, for example. Accordingly, all such ground stations 14 may be aligned to true North to establish a common reference bearing for all bearing measurements. However, bearing measurements to the lightning strike of mobile stations cannot be fixed mechanically to the common bearing reference because of the individualized orientation and mobility of each station. For this reason, each mobile station 10 and 12, for example, includes a way for compensating the detected bearing signal of the lightning strike according to the orientation or mobility of that station corresponding to the time of occurrence of the detected lightning strike to provide a compensated or corrected bearing signal referenced to the common reference bearing or, in the present embodiment, true North. In this manner, the real time bearing signals of the strike reports are all referenced to the common reference bearing for correlation purposes.

The mobile stations 10 and 12 may also include a display for displaying substantially in real time each of the detected lightning strikes to the operator of the mobile craft based on the more accurate computed range and the measured bearing signal so that the operator may be in a better position to chart a course or conduct a landing to avoid the adverse weather pattern associated with the lightning strike or strikes. The entire scenario just described may be accomplished by the distributed system substantially in real time because of the speed at which the data reports are transmitted, received and processed at the respective stations thereof.

Figure 2:
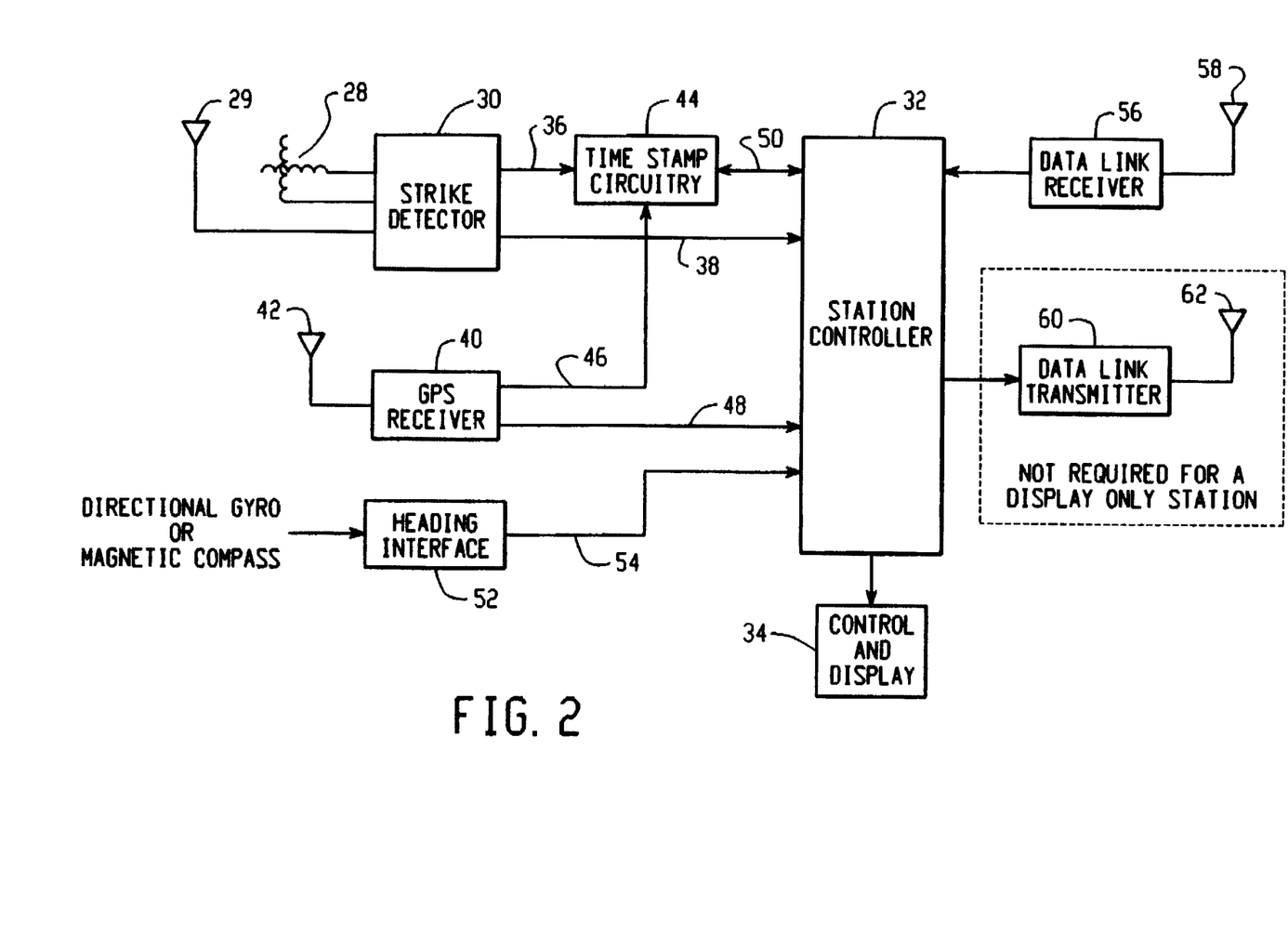
FIG. 2 is a block diagram schematic embodiment of a lightning detection station suitable for use, wholly or partially, on board a mobile craft or in a ground reporting station as described in connection with FIG. 1.

An exemplary embodiment of a lightning detection station as shown in FIG. 2 includes cross loop magnetic sensors 28 and electric field antenna 29 which both feed into a strike detector unit 30, which in turn is coupled to a station controller 32 which controls a control and display unit 34. The aforementioned elements 28, 29, 30, 32 and 34 may be structurally and operationally the same as that described for the Stormscope® lightning detection unit in the U.S. Pat. No. 5,325,299 issued Jun. 28, 1994 and assigned to the same assignee as the present application which patent being incorporated by referenced herein for a more detailed understanding of the structure and operation of such elements. In the present embodiment, the cross loop magnetic sensors 28 and antenna 29 of the mobile stations 10 and 12 may be aligned with the heading of the aircraft and the same sensors 28 and 29 of a non-mobile or ground based station may be aligned with the common reference bearing true North, for example.

In operation, the sensor 28 senses the X and Y components of the magnetic field radiation of the lightning strike 22 and the sensor 29 senses the electric field radiation of the same lightning strike. The strike detector unit 30 processes the sensed signaling of the sensors 28 and 29 to provide a strike indication signal over signal lines 36 and 38 and estimated range and bearing signals over signal line 38 to the station controller 32. Note that the bearing signal is measured relative to the directional heading of the mobile craft. In turn, the station controller 32 operates to create a detected strike report from the estimated range and bearing information for displaying the lightning strike as a symbol on the display 34 using the measured bearing and estimated range should the report be un-correlated.

In accordance with the present invention, in order to create a common frame of reference in both time and position for all of the stations of the distributed system, signals are received from at least one common transmitting system. In the present embodiment, a GPS receiver 40 including antenna 42 is included for receiving signals from the GPS system. The receiver 40 may be of the type manufactured by Rockwell International, Model No. Navcore V, for example, which generates time marks at approximately one second intervals that are accurate in time to one microsecond. These time mark signals are provided over signal line 46 to a time stamp circuitry 44. Real time and the station's own position data are provided from the GPS receiver over signal line 48 to the station controller 32 at times corresponding to the time mark signals. Note that the position change of the mobile craft in one second is considered well within the accuracy requirements of the lightning detection system. Accordingly, the latest position update received from the GPS receiver with respect to the common frame of reference prior to a detected lightning strike may be used as the observation position without degradation of the system accuracy.

For each strike report, a lightning strike may be tagged with the observation time of occurrence and position corresponding to the observed lightning strike. The GPS receiver 40 provides each station with accurate time and position information which may be used for this purpose. However, many lightning strikes may occur within the one second intervals of the GPS time mark signals. The time stamp circuitry 44 is used to provide a more accurate observation time of occurrence, one more consistent with approximately one microsecond accuracy. More specifically, in the circuitry 44, the time between a time mark signal and a lightning strike indication may be interpolated by a counter referred to as the ΔT register having at least one microsecond accuracy.

Another important aspect of the distributed lightning detection system is keeping track of the heading of the mobile craft or aircraft because the bearing signal of a lightning strike is generally measured relative to the directional heading of the mobile craft. Most mobile craft employ either of two common measuring devices, a directional gyro or a magnetic compass, for measuring the directional heading thereof with respect to magnetic north. Accordingly, a signal from either a directional gyro or magnetic compass may be coupled to the station controller 32 through a conventional heading interface circuit 52 and signal line 54 and the controller 32 may correct the relative strike bearing measurement to the reference bearing of magnetic north through use of this directional heading information. The bearing relative to magnetic north may then be corrected to the common reference bearing of true North by adding the local magnetic variation $\Theta_V$ which can be derived from a well-known mathematical model of the earth.

The exemplary station embodiment also includes a conventional data link receiver 56 including receiving antenna 58 for receiving lightning strike observation data reports over the data link from other sources including other lightning detection stations, both mobile and non-mobile. In order to render the system fully distributed, it is preferred that the mobile stations include a data link transmitter 60 including a transmitting antenna 62 for transmitting the stations observation strike reports to other lightning detection stations, the mobile stations being the most important especially in regions sparsely populated with ground reporting stations or where there are no reporting stations, i.e. additional lightning strike observation data reports being received solely from other mobile craft in the vicinity.

While the data link receiver 56 and data link transmitter 60 in the present embodiment are shown as separate and individual units it is understood that it is common to have receiver/transmitter units integrated together in a single unit using a common antenna with a change over switch for operating the antenna in one or the other of the receiving and transmitting modes. It is further understood that because of the fixed geographical position, the ground based reporting stations may be implemented without any navigational aids for determining directional heading and without a data link receiver for receiving observational data of lightning strikes from other sources. Further, with regard to the data link receiver and transmitter, the receiver may consist of an RF front end and a demodulator to separate the digital serial bit stream signals from the carrier. Conventional modem technology permit transfer rates of up to 28,800 bits per second and newer technology may allow many more time slots within a given channel. Even the most modern V.FAST protocol may be used on the RF data link with only a few control parameter changes from that conventionally used. Similarly, the transmitter may consist of an RF section and a modulator to modulate the bit stream on to the carrier. Power level similar to standard aircraft VHF communications power levels should be adequate for the present embodiment.

Figure 3:
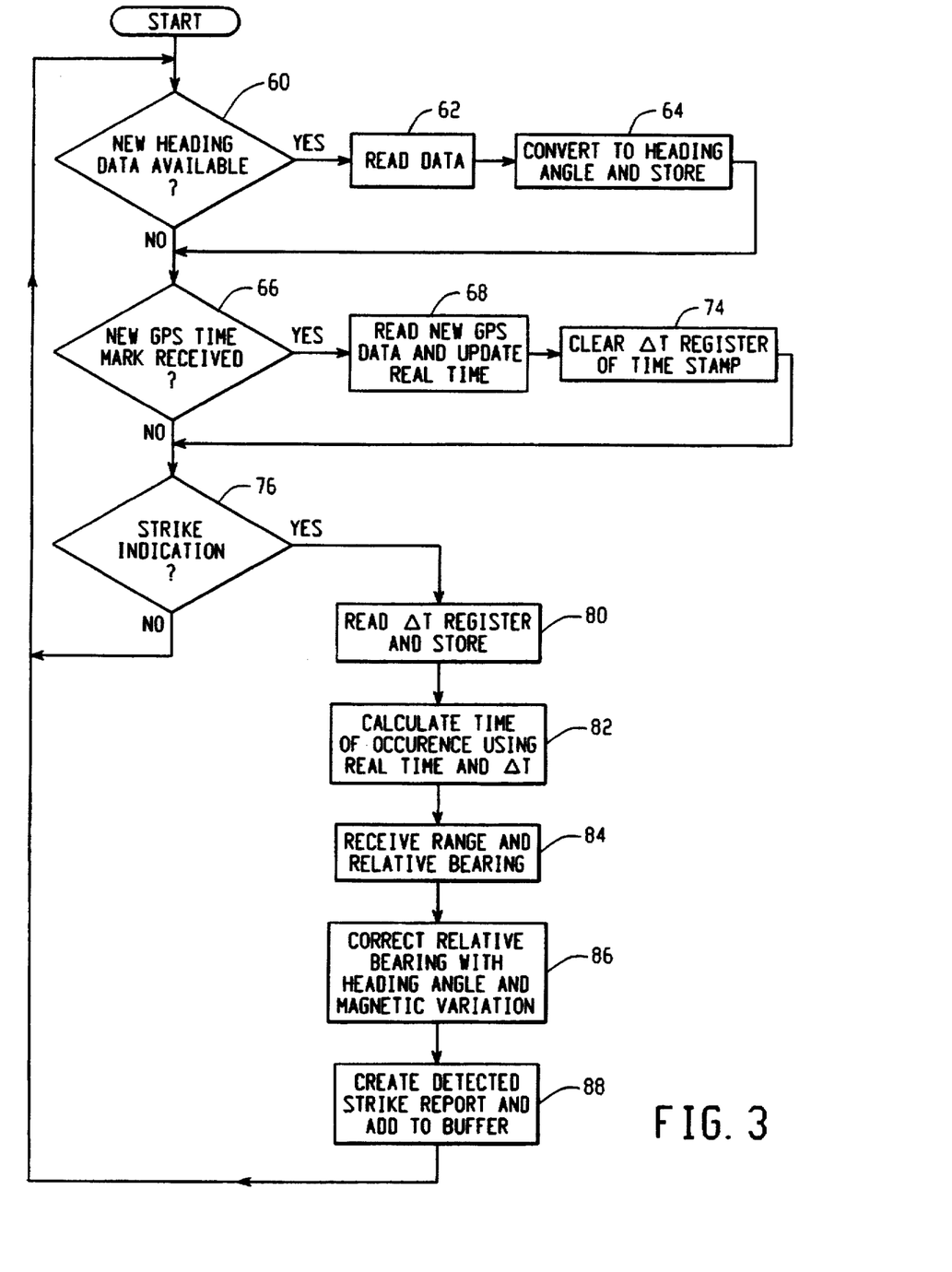
FIG. 3 is a software flow chart suitable for describing the programmed operations of the station's controller of FIG. 2.

In the present embodiment, the station controller 32 of FIG. 2 may be a microprocessor unit operative under program control for cooperating with the ancillary units coupled thereto for accessing, processing and controlling lightning strike data. The exemplary flow chart of FIG. 3 will be used for explaining the programmed operation of the station controller 32 in connection with creating lightning strike reports and the storage thereof. Referring to FIG. 3, when new heading data is available from the navigational aids of the directional gyro or magnetic compass on board the mobile craft via the heading interface 52, a flag may be set in the station controller 32 and determined by a decisional block 60. When the flag is set, the station controller 32 reads the new heading data via interface 52 and signal lines 54 into the memory thereof in accordance with the instructions of block 62 and thereafter, converts the heading data into a heading angle and stores the new heading angle in the memory in block 64. If no new heading data is available as determined by block 60, blocks 62 and 64 are circumvented.

In any event, execution continues at decisional block 66 where it is determined whether or not a new GPS time mark signal is received over signal lines 38. If received, the new GPS data corresponding to the recent time mark signal is read in to the station controller 32 via block 68 at a predetermined time thereafter. This operation is illustrated by the time waveforms A and B of FIG. 4. For example, a time mark signal 70 is received by station controller 32 and within a predetermined time thereof new GPS data is read by the station controller 32 over the time interval 72. Referring to FIG. 2 as well, immediately upon a time mark signal 70, the station controller 32 at block 74 sends a signal over bi-directional signal lines 50 to the time stamp circuitry 44 to clear the counter thereof (i.e. reset to 0). After block 74 or if no new time mark is received, program execution continues at decisional block 76 to determine if a strike indication signal is received over signal line 38.

Figure 4:
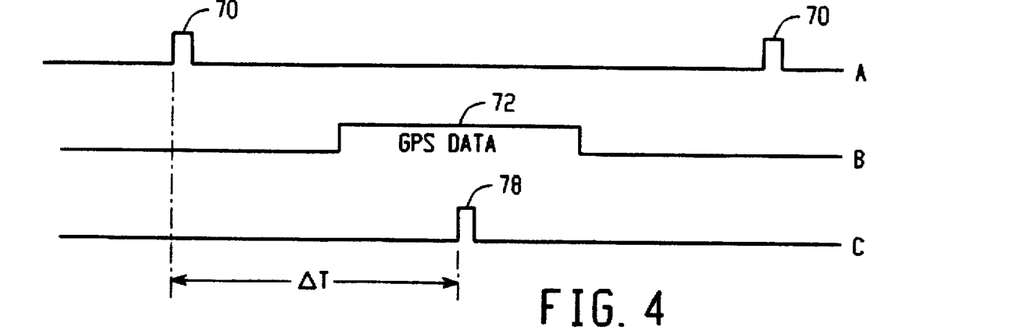
FIG. 4 depicts timing wave forms A, B and C, for describing the operations of the time stamp circuitry of the embodiment of FIG. 2.

A strike indication pulse signal 78 is exemplified in waveform C of FIG. 4 in relation to a time mark signal 70 of the GPS receiver 40 (waveform A). Note that between pulse 70 and pulse 78, the counter or ΔT register of circuitry 44 is increasing in increments of at least one (1) microsecond and, at pulse 78, has an accumulated count representative of the pulse duration between pulses 70 and 78 which is referred to as ΔT. When a pulse 78 is received by controller 32, block 76 diverts program execution to block 80. In instruction block 80, the station controller 32 reads the ΔT register of circuitry 44 over signal lines 50 and stores the resultant digital data representative of ΔT in the memory thereof. Next in block 82, the controller 32 calculates the observation time of occurrence of the lightning strike corresponding to the indication 78 using the real time data from the GPS receiver 40 corresponding to the pulse 70 and the ΔT read in from block 80.

Figure 5:
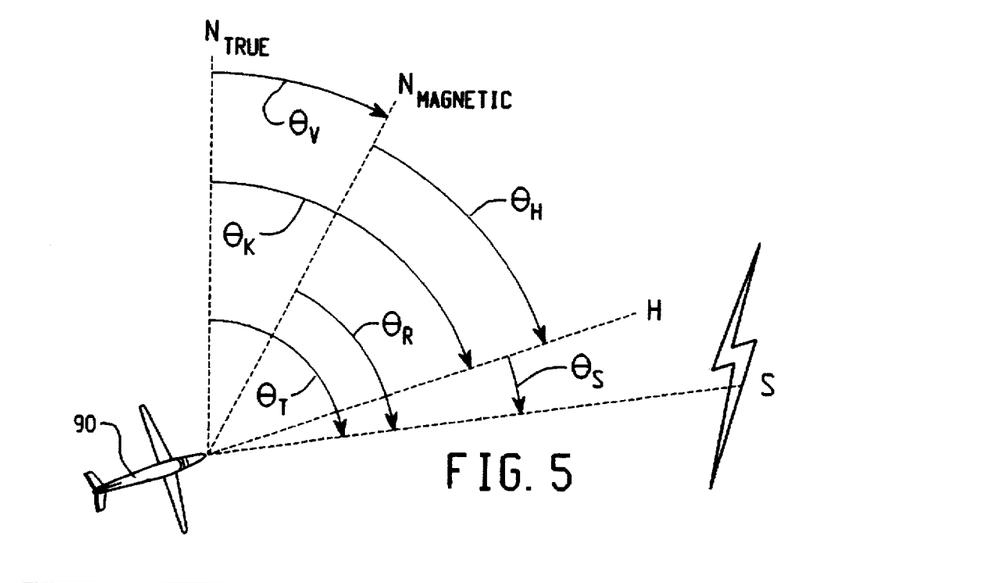
FIG. 5 is a sketch illustrating the correction of a strike bearing measurement to a common reference bearing based on the measured heading of a mobile craft.

Next in block 84 the controller 32 receives the estimated range and relative bearing signals from the strike detector 30 over signal lines 38 corresponding to the indication signal 78, the relative bearing being measured with respect to the directional heading of the mobile craft. In block 86, the relative bearing signal is corrected with the heading angle of the mobile craft from block 54 and the local magnetic variation to render the bearing signal referenced to the common reference bearing or true North. This operation is exemplified by the illustration of FIG. 5 wherein an aircraft 90 is representative of a mobile craft having a directional heading H. The strike detection 30 of the aircraft 90 receives radiation from strikes and measures a bearing $\Theta_S$ with respect to the heading H. The navigational aid of the aircraft 90 provides a heading $\Theta_H$ in relation to magnetic north. The correction operation occurring in block 86 may add the bearing angles $\Theta_H$ and $\Theta_S$ to yield a bearing angle $\Theta_R$ relative with respect to magnetic north. The magnetic variation $\Theta_V$ is then added to $\Theta_R$, the magnetic bearing, to calculate $\Theta_T$, the bearing relative to true North. In this way, all of the relative bearing estimates of the mobile craft may be referenced to a common reference bearing or true North for purposes of correlation with other lightning strike reports.

Figure 6:
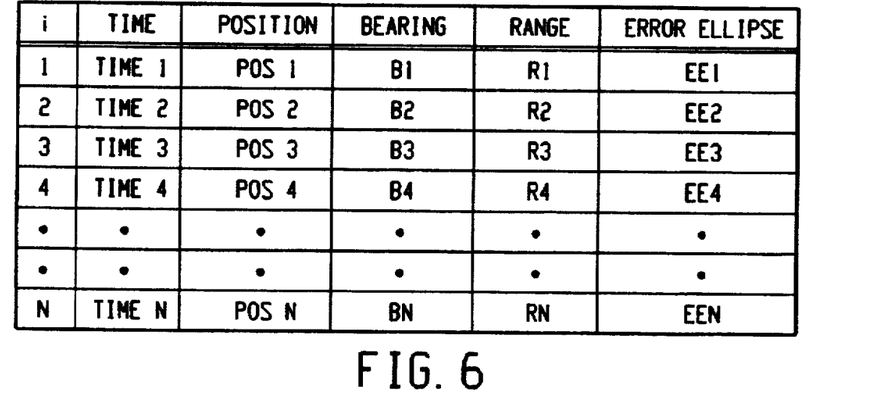
FIG. 6 illustrates a list of lightning strike reports which may be stored in a memory of the station's controller of the embodiment of FIG. 2.

In the next block 88, the lightning strike observation data reports are created using the calculated and received information of the aforementioned blocks and each report is added to a memory buffer similar to that illustrated by FIG. 6. The observation data reports may be ordered in the memory buffer in accordance with the observation time of occurrence of each. That is, those strikes occurring first will be indexed first those occurring later with be indexed later. A typical report of a lightning strike denoted as i=1 may include an observation time of occurrence denoted as TIME 1, the position POS1 of the mobile craft corresponding to TIME 1, the bearing B1 and range R1 estimates provided by the strike detection 30, and error ellipse data EE1 which is indicative of the uncertainties in range and bearing peculiar to the strike detection measurement. Each of the other reports i=2, 3, 4, ... N will be stored in memory sequentially according to their observation times.

Figure 7:
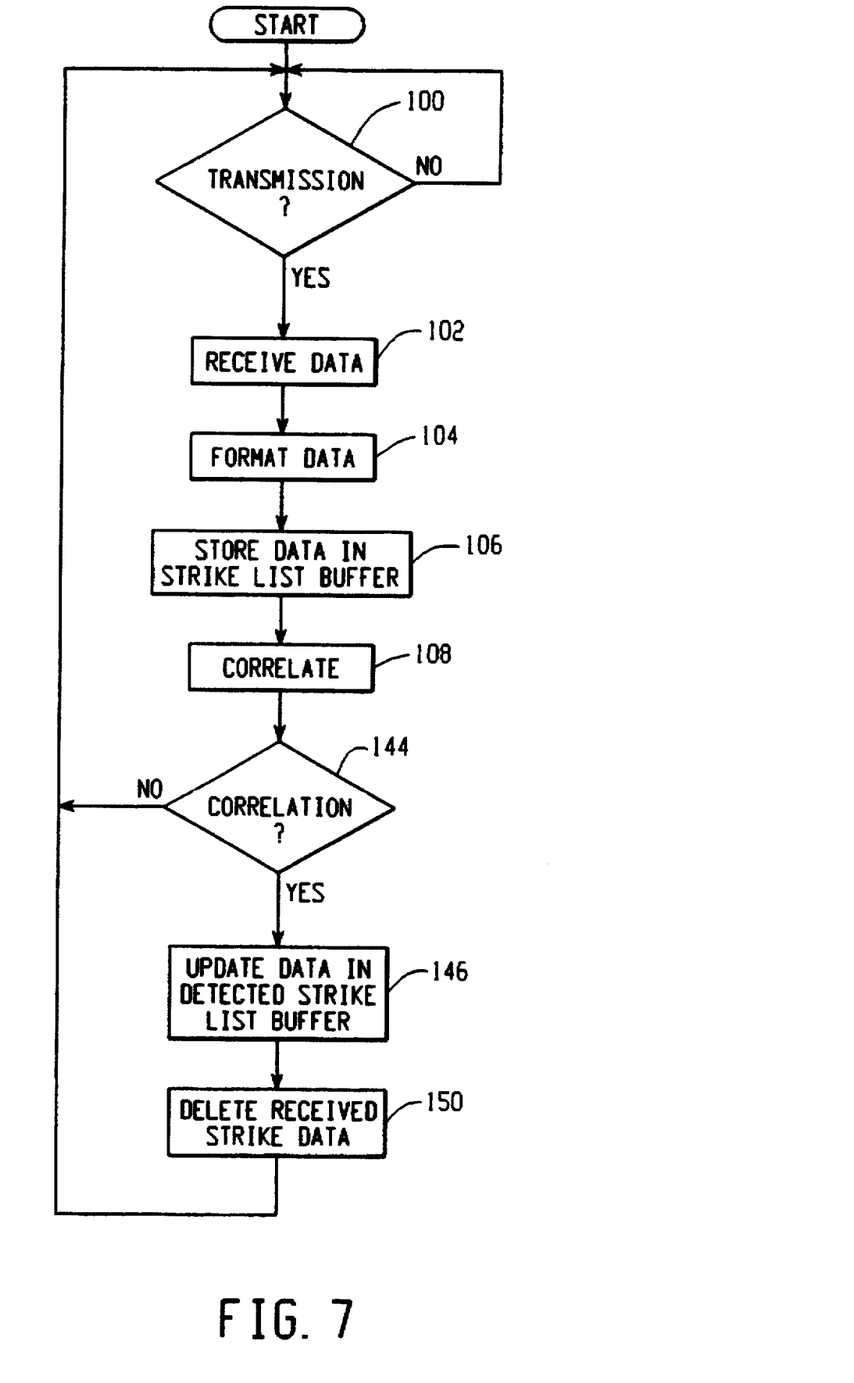
FIGS. 7, 8 and 9 all depict software flow charts used for describing different programmed operations of the station's controller embodiment of FIG. 2.

Referring to FIG. 7, in decisional block 100 the station controller 32 monitors the data link receiver 56 to determine if a strike observation data report is being transmitted from another source or station. Upon transmission detection, the station controller 32 receives data from the data link receiver 56 in block 102 and formats the digitized serial data into a received strike report comparable to the reports described in connection with the example of FIG. 6. Thus, each formatted received strike report will include an observation time of occurrence, an observation position, a bearing and range and associated error ellipse data. In block 106, the received strike report is stored in a strike list buffer of the station controller 32 and thereafter correlated in block 108 with the strike reports of the strike list memory described in connection with FIG. 6. An exemplary correlation process is depicted by the software flow chart of FIG. 8.

Figure 8:
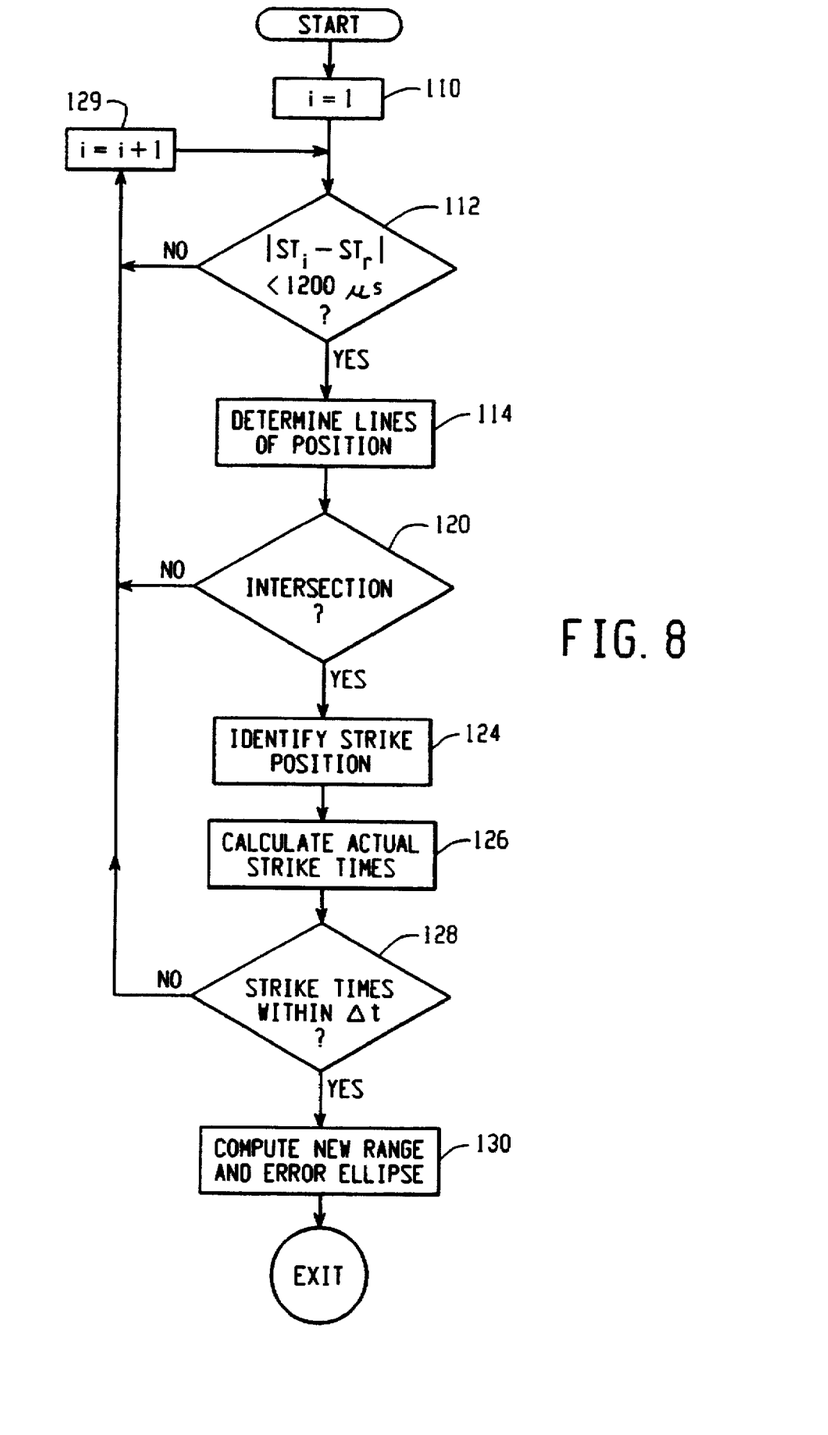
Figure 10:
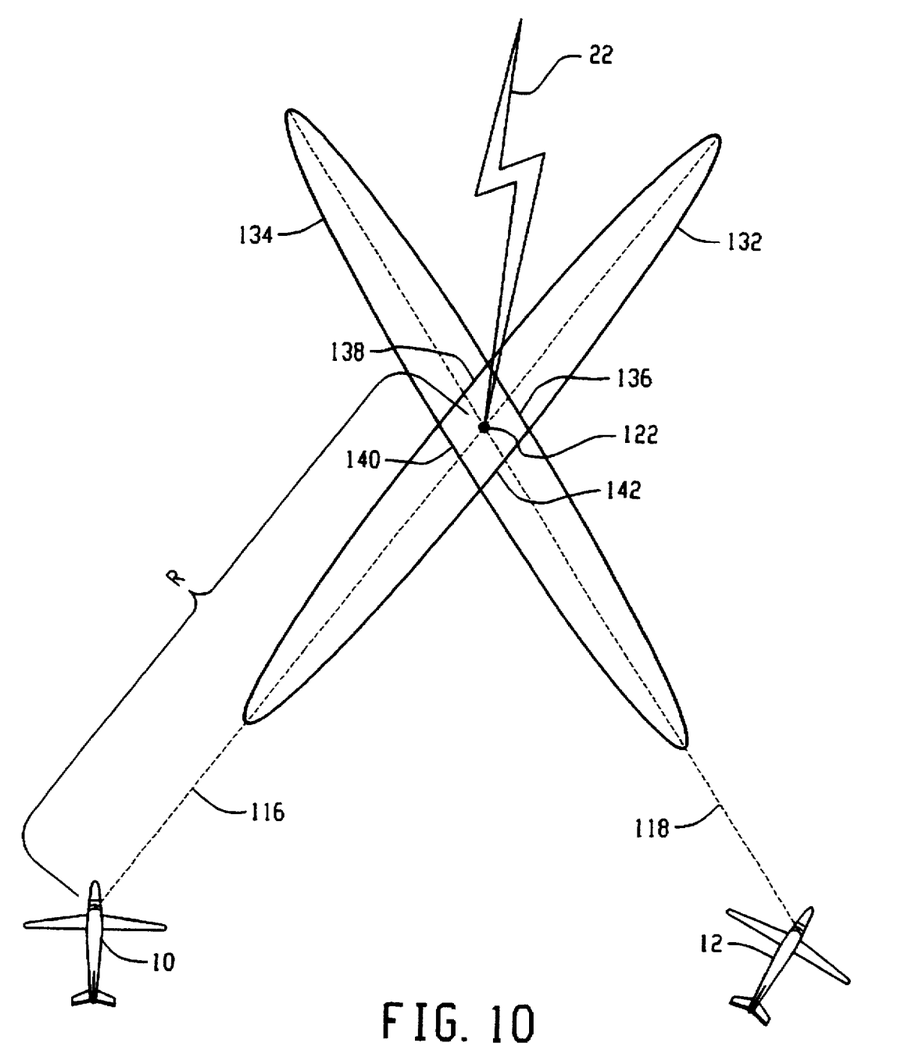
FIG. 10 is an illustration exemplifying the correlation of lightning strike observation data from two lightning detection stations of an embodiment described in connection with FIG. 2.

Referring to FIG. 8, an index is started at one in block 110. In the flow chart, each detected strike time of occurrence is denoted as STi and each strike time of a received strike report is denoted $ST_R$. Since it is known that 200 nautical miles is about the limit of the detection range of a lightning strike detector unit, and that the speed of light, i.e. electromagnetic radiation, is approximately 6 microseconds per nautical mile, to ensure the correlation is conducted with viable strike data, it is limited to strike reports from stations within 200 miles of each other which amount to observation times of less than 1200 microseconds. Accordingly, an initial step in the correlation process of the present embodiment as conducted by decisional block 112 compares the observation times of occurrence of a received strike report with the same of each detected strike report to establish whether or not the pair is within the viable range for detecting lightning strikes. If the test of block 112 is passed, block 114 determines the lines of position (LOP's) of the two strike reports from the bearings and observation positions thereof. These lines of position are exemplified in the illustration of FIG. 10. For example the dashed line 116 represents the line of position from the aircraft 10 to the lightning strike 22 and the dashed line 118 represents the line of position from the aircraft 12 to the same lightning strike 22. Accordingly, each strike observation report produces a LOP defined by the bearing angle to the strike, referenced to the common bearing reference, from the observation position of the common frame of reference. The two strike observation reports, one detected locally and the other remotely may or may not produce intersecting LOP's. If the two LOP's do not intersect then they cannot possibly have been produced by the same strike. Intersection is determined in the decisional block 120 which may use a flat Earth (RHUMB line) since the distances of the observations are less than 400 nautical miles. As shown in the example of FIG. 10, an intersection occurs at point 122 and by using the LOP's of the two observations a strike position is calculated using well known triangulation techniques in block 124. However, it is not known whether or not this intersection of the LOP's results from a common lightning strike or two different lightning strikes. The dimension of time may be used in the present embodiment for confirmation of a common lightning strike from the intersection of two LOP's.

This step of using the dimension of time in the correlation process involves the knowledge that the observation time of a strike is the actual strike time plus the time the electric and magnetic fields take to propagate from the strike to the observation point, this propagation being at the speed of light. Thus knowing the intersection point 122 and the observation position of each of the stations 10 and 12 of the observation reports being correlated, the distance therebetween and thus the propagation times associated therewith can thus be computed. Thereafter, estimated actual strike times associated with each observation report may be calculated by subtracting the respective propagation time from the corresponding observation time which is performed in block 126. In the decisional block 128, it is next determined if the two estimates of the actual strike times agree within a timing error budget $\Delta t$ of the system which may be on the order of a few micro seconds. If these times agree as determined by block 128, the corresponding observation reports are considered correlated, i.e. containing observation data from a common lightning strike and program execution continues at block 130. Otherwise, program execution continues at block 129 wherein the index is incremented to the next observation report of the detected strike list buffer and the steps of the flow chart of FIG. 8 are repeated until all of the observation strike reports of the detected strike list buffer have been processed for correlation with the received observation strike report.

In block 130, a new range and error ellipse may be computed for the correlated observation reports. An example of this computation is shown in the illustration of FIG. 10. Referring to FIG. 10, the error ellipse associated with the observation report of aircraft 10 is depicted by the solid line 132 and the error ellipse associated with the received observation report from aircraft 12 is denoted by the solid line 134. Note that both error ellipses include an uncertainty in both range and bearing measurements. The overlapping areas of the two ellipses 132 and 134 produces the new error ellipse bounded by the lines 136, 138, 140 and 142. Upon execution of block 130, the program flow of FIG. 8 exits back to block 144 of FIG. 7. Upon correlation, the decisional block 144 of the flow chart of FIG. 7 conducts program execution to block 146 to update the data in the detected strike list buffer with the new range R calculated as the distance between the observation location of aircraft 10 and the intersection 122 and also the error ellipse with the new error ellipse defined by the lines 136, 138, 140 and 142. Thereafter, execution is continued in block 150 of the flow chart of FIG. 7 which deletes the observation report from the received strike list buffer and the next observation report of a received strike in the buffer is processed starting at block 102 with the detected strike reports to identify possible correlations therewith. This process will be continued for all received and undeleted strike reports in the buffer.

Figure 9:
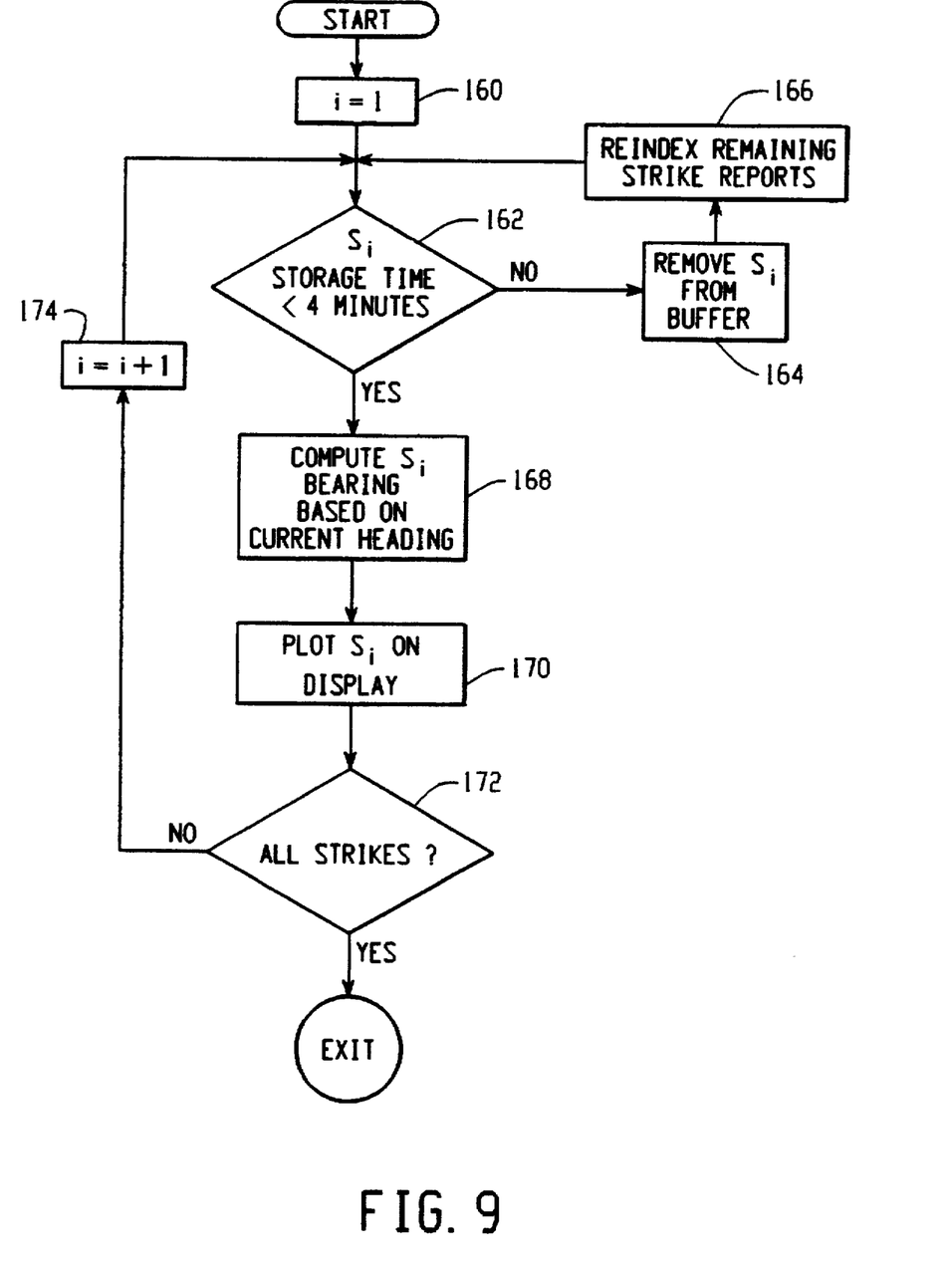

In the present embodiment, the observation strike reports of the detected strike list buffer are used by the station controller 32 for control of the display 34. A program for this purpose is exemplified in the flow chart of FIG. 9. Referring to FIG. 9, an index is initiated at one in the block 160 to start with the first observation report of the detected strike list buffer. In the decisional block 162, it is determined if the observation report is from a strike which is to old to be displayed, that is, stored in the buffer for more than a predetermined time, say 4 minutes, for example. If the report was stored for 4 minutes or longer, the report is removed from the buffer in the block 164 and the remaining strike reports are reindexed so that there is consecutive numbering of all of the observation reports in the detected strike buffer. Thus, if the strike report indexed as one is removed, the next or subsequent report will be reindexed as one and the decisional block 162 will be re-executed. If the storage time is less than 4 minutes then in block 168, the bearing information of the observation report $S_i$ is recomputed to be based on the current heading of the mobile craft which is obtained from the heading interface 52 over line 54. Referring back to the sketch of FIG. 5, the current true heading $\Theta_K$ is subtracted from the report heading, $\Theta_T$ to provide the strike bearing $\Theta_S$ based on the current heading H of the aircraft. In block 170 a strike symbol is plotted on the display 34 based on the recomputed bearing and computed range data of the current observation report. The error ellipse information may also be plotted on the display in the form of a enclosed area surrounding the strike symbol, for example. Decisional block 172 determines if all of the observation reports of the detected strike buffer have been displayed and if not the index is increased by one in block 174 and the display processing is repeated for the next observation report until all of the observation reports have been processed.

While the present invention has been described above in connection with a preferred embodiment, it is understood that modification may be made thereto and other embodiments used without deviating from the principles thereof. Accordingly, the present invention should not be limited to any single embodiment but rather construed in scope and breadth in accordance with the appended claims hereto.

I claim:

1. A distributed lightning detection system comprising:
   a plurality of lightning detection stations located at different positions with respect to a common frame of reference with the position of at least one detection station being mobile with respect to said common frame of reference, each station including:
   means for detecting a lightning strike and providing an indication signal and bearing signal corresponding thereto;
   first means for receiving signals from at least one common transmitting system for establishing a common time frame for all of said stations and the station's own position with respect to said common frame of reference;
   processing means governed by said indication signal and operatively cooperating with said first receiving means to determine a time of occurrence of said detected lightning strike with respect to said common time frame and the station's own position corresponding to the detected strike, said processing means operative to generate a report for each detected strike including data of time of occurrence, station's own position corresponding to said time of occurrence, and bearing signal from said detecting means corresponding to each said strike;
   means for transmitting said strike report of said processing means over a data link to other lightning detection stations; and
   second means for receiving said strike reports from other lightning detection stations over said data link and providing same to said processing means, wherein said processing means operative to correlate received strike reports with detected strike reports to determine reports generated from common lightning strikes and to compute a range from said station to each said common lightning strike based on the data of the correlated strike reports corresponding thereto; and
   wherein each mobile station includes means for compensating the bearing signal of said detected lightning strike according to the mobility of said station corresponding to the time of occurrence of said detected lightning strike thereof to provide a compensated bearing signal which is used by said processing means in correlating said detected and received strike reports.

2. The system in accordance with claim 1 wherein the detecting means of the mobile station provides the bearing signal of the detected lightning strike with respect to the directional heading of the mobile station; wherein the compensating means includes means for measuring the bearing of said directional heading with respect to a reference bearing common to all of the stations and generating a measured bearing signal indicative thereof, and wherein the processing means of the mobile station is operative to compensate the bearing signal of the detected lightning strike with the measured bearing signal corresponding to the time of occurrence of the corresponding strike to generate the compensated bearing signal.

3. The system is in accordance with claim 2 wherein the common reference bearing is true North.

4. The system in accordance with claim 1 wherein the first receiving means includes a GPS receiver for receiving signals from satellites of the Global Positioning System (GPS).

5. The system in accordance with claim 4 wherein the GPS receiver is operative to generate timing pulses periodically along with the real time of the common time frame at such pulses; and wherein the processing means includes means for measuring the time difference between one of the timing pulses and the indication signal of a detected lightning strike and combining it with the real time corresponding to said one pulse for determining the time of occurrence of said lightning strike.

6. The system in accordance with claim 1 wherein at least the mobile station includes a display controlled by the processing means for displaying the detected lightning strikes based on the computed range and provided bearing signal thereof.

7. The system in accordance with claim 1 wherein the processing means includes a memory means for storing the reports generated for the detected lightning strikes.

8. The system in accordance with claim 1 wherein the data link between stations includes a wireless communication channel of at least one modulated carrier frequency.

9. A distributed lightning detection system comprising:

a plurality of lightning detection stations located at different positions with respect to a common frame of reference with the position of at least one detection station being mobile with respect to said common frame of reference, a non-mobile station including:

first means for detecting a lightning strike and providing an indication signal and a first bearing signal corresponding thereto, said first bearing signal being based on a reference bearing common to all stations;

first means for receiving signals from at least one common transmitting system for establishing a common time frame for all of said stations and the station's own position with respect to said common frame of reference;

first processing means governed by said indication signal of said first detecting means and operatively cooperating with said first receiving means to determine a time of occurrence of said detected lightning strike of said first detecting means with respect to said common time frame, and the station's own position corresponding to said detected strike, said first processing means operative to generate a report for each detected strike of said first detecting means including data of time of occurrence, station's own position, and first bearing signal from said first detecting means corresponding to each said strike; and first means for transmitting said strike reports of said first processing means over a data link to other lightning detection stations; and each mobile lightning detection station including:

second means for detecting a lightning strike and providing an indication signal and a second bearing signal corresponding thereto, said second bearing signal being based on the orientation of said station;

third means for receiving signals from at least one common transmitting system for establishing said common time frame for all of said stations and the station's own position with respect to said common frame of reference;

second processing means governed by said indication signal of said second detecting means and operatively cooperating with said third receiving means to determine a time of occurrence of said detected lightning strike of said second detecting means with respect to said common time frame, and the station's own position corresponding to said detected strike, said second processing means operative to generate a report for each detected strike of said second detecting means including data of time of occurrence, station's own position corresponding to said time of occurrence, and second bearing signal from said second detecting means corresponding to each said strike;

means for measuring the orientation of the mobile station with respect to said common reference bearing and providing an orientation signal indicative thereof, wherein said second processing means operative to adjust said second bearing signal with said orientation signal corresponding to the time of occurrence of said corresponding lightning strike to generate a third bearing signal of said lightning strike which is based on said common reference bearing; and fourth means for receiving said strike reports from other lightning detection stations over said data link and providing same to said second processing means, wherein said second processing means operative to correlate received strike reports with detected strike reports to determine reports generated from common lightning strikes and to compute a range from said station to each said common lightning strike based on the data of the correlated strike reports corresponding thereto, said second processing means using the third bearing signals of said detected lightning strikes in the correlation process.

10. The system in accordance with claim 9 wherein the second detecting means provides the second bearing signal of the detected lightning strike with respect to the directional heading of the mobile station; wherein the measuring means includes means for measuring the bearing of said directional heading with respect to said common reference bearing and generating the orientation signal indicative thereof.

11. The system in accordance with claim 10 wherein the common reference bearing is true North.

12. The system in accordance with claim 9 wherein each of the first and third receiving means includes a GPS receiver for receiving signals from satellites of the Global Positioning System (GPS).

13. The system in accordance with claim 12 wherein the GPS receiver is operative to generate timing pulses periodically along with the real time of the common time frame at such pulses; and wherein each of the first and second processing means includes means for measuring the time difference between one of the timing pulses and the indication signal of a detected lightning strike and combining it with the real time corresponding to said one pulse for determining the time of occurrence of said lightning strike in each case.

14. The system in accordance with claim 9 wherein at least each mobile station includes a display controlled by the second processing means for displaying the detected lightning strikes based on the computed range and provided bearing signal thereof.

15. The system in accordance with claim 9 wherein each of the first and second processing means includes a memory means for storing the reports generated for the detected lightning strikes.

16. The system in accordance with claim 9 wherein the data link between stations includes a wireless communication channel of at least one modulated carrier frequency.

17. The system in accordance with claim 9 wherein the non-mobile station includes second means for receiving strike reports from mobile lightning detection stations over said data link and providing same to the first processing means, wherein the first processing means operative to correlate received strike reports with detected strike reports to determine reports generated from common lightning strikes and to compute a range from said station to each said common lightning strike based on the data of the correlated strike reports corresponding thereto.

18. The system in accordance with claim 9 wherein the mobile station includes second means for transmitting said strike reports of the second processing means over the data link to other lightning detection stations.

19. The system in accordance with claim 9 wherein the mobile station is disposed on-board a mobile craft.

20. The system in accordance with claim 19 wherein the mobile craft is an aircraft.

21. A lightning detection station located on-board a mobile craft and using lightning information transmitted from at least one other source over a data link to determine ranges from said mobile craft to detected lightning strikes, said on-board station comprising:

means for detecting a lightning strike and providing an indication signal and a bearing signal corresponding thereto, said bearing signal being based on the orientation of said mobile craft;

first means for receiving signals from at least one common transmitting system for establishing a common time frame for all of said stations and the mobile craft's own position with respect to a common frame of reference;

processing means governed by said indication signal and operatively cooperating with said first receiving means to determine a time of occurrence of said detected lightning strike with respect to said common time frame, and the craft's own position corresponding to said detected strike, said processing means operative to generate a report for each detected strike of said detecting means including data of time of occurrence, craft's own position corresponding to said time of occurrence, and bearing signal from said detecting means corresponding to each said strike;

means for measuring the orientation of the mobile craft with respect to a common reference bearing and providing an orientation signal indicative thereof, wherein said processing means operative to adjust said bearing signal with said orientation signal corresponding to the time of occurrence of said corresponding lightning strike to generate a second bearing signal of said lightning strike which is based on said common reference bearing; and second means for receiving strike reports from said at least one other source over said data link and providing same to said processing means, said received strike reports including lightning data analogous to the detected strike reports generated by said processing means and based on said common time frame, frame of reference and reference bearing, wherein said processing means operative to correlate received strike reports with detected strike reports to determine reports generated from common lightning strikes and to compute a range from said mobile craft to each said common lightning strike based on the data of the correlated strike reports corresponding thereto, said processing means using the second bearing signals of said detected lightning strikes in the correlation process.

22. The station in accordance with claim 21 wherein the detecting means provides the bearing signal of the detected lightning strike with respect to the directional heading of the mobile craft; and wherein the measuring means includes means for measuring the bearing of said directional heading with respect to the common reference bearing and providing the orientation signal indicative thereof.

23. The station in accordance with claim 22 wherein the common reference bearing is true North.

24. The station in accordance with claim 21 wherein the first receiving means includes a GPS receiver for receiving signals from satellites of the Global Positioning System (GPS).

25. The system in accordance with claim 24 wherein the GPS receiver is operative to generate timing pulses periodically along with the real time of the common time frame at such pulses; and wherein the processing means includes means for measuring the time difference between one of the timing pulses and the indication signal of a detected lightning strike and combining it with the real time corresponding to said one pulse for determining the time of occurrence of said lightning strike.

26. The station in accordance with claim 21 including a display controlled by the processing means for displaying the detected lightning strikes based on the computed range and provided bearing signal thereof.

27. The station in accordance with claim 21 wherein the processing means includes a memory means for storing the reports generated for the detected lightning strikes.

28. The station in accordance with claim 21 wherein the data link includes a wireless communication channel of at least one modulated carrier frequency.

29. The station in accordance with claim 21 wherein the mobile craft is an aircraft.

30. The station in accordance with claim 21 wherein the other source includes a lightning detection station.

31. Method of determining ranges from a mobile craft to lightning strikes detected thereby using lightning data received over a data link to the mobile craft, said method comprising the steps of:

detecting a lightning strike from on-board said mobile craft and providing an indication signal and a bearing signal corresponding thereto, said bearing signal being based on the orientation of said mobile craft;

receiving signals from at least one common transmitting system for establishing a common time frame for all of said lightning data and the mobile craft's own position with respect to a common frame of reference;

determining a time of occurrence of said detected lightning strike from said indication signal and with respect to said common time frame, and the station's own position corresponding to said detected strike;

generating a report for each detected strike including data of time of occurrence, craft's own position corresponding to said time of occurrence, and bearing signal corresponding to each said strike;

measuring the orientation of the mobile craft with respect to a common reference bearing and providing an orientation signal indicative thereof;

adjusting said bearing signal with said orientation signal corresponding to the time of occurrence of said corresponding lightning strike to generate a second bearing signal of said lightning strike which is based on said common reference bearing; and receiving strike reports from over said data link to the mobile craft, said received strike reports including lightning data analogous to the generated detected strike reports and based on said common time frame, frame of reference and reference bearing;

correlating said received strike reports with detected strike reports to determine reports generated from common lightning strikes, said second bearing signals of said detected lightning strikes being used in the correlating step; and computing a range from said mobile craft to each said common lightning strike based on the data of the correlated strike reports corresponding thereto.

32. The method in accordance with claim 31 wherein the step of detecting includes providing the bearing signal of the detected lightning strike with respect to the directional heading of the mobile craft; and wherein the step of measuring includes measuring the bearing of said directional heading with respect to the common reference bearing and providing the orientation signal indicative thereof.

33. The method in accordance with claim 32 wherein the common reference bearing is true North.

34. The method in accordance with claim 31 wherein the step of receiving signal includes receiving signals from satellites of the Global Positioning System (GPS).

35. The method in accordance with claim 24 wherein the step of determining includes generating timing pulses periodically along with the real time of the common time frame at such pulses from the signals received from the GPS satellites, measuring the time difference between one of the timing pulses and the indication signal of a detected lightning strike and combining it with the real time corresponding to said one pulse for determining the time of occurrence of said lightning strike.

36. The method in accordance with claim 31 including displaying the detected lightning strikes based on the computed range and provided bearing signal thereof.

37. The method in accordance with claim 31 including storing the reports generated for the detected lightning strikes.

38. The method in accordance with claim 31 wherein the data link includes a wireless communication channel of at least one modulated carrier frequency.

39. The method in accordance with claim 31 wherein the mobile craft is an aircraft.

40. The method in accordance with claim 31 wherein the step of correlating includes the step of:

initially determining that the time of strike occurrence of the received strike report is within a first predetermined time of the time of strike occurrence of the detected strike report.

41. The method in accordance with claim 31 wherein the step of correlating the received and detected strike reports includes the steps of:

determining from the own positions of both reports lines of position (LOP's) based on the respective bearing signals thereof;

determining an intersection point of said LOP's;

determining from the times of strike occurrence of both reports corresponding actual times of occurrence by accounting for the propagation time of light from the intersection point to the respective own positions of both reports; and determining that the actual times of occurrence match within a predetermined time differential.

42. The method in accordance with claim 41 wherein the step of computing the range includes the step of:

computing the distance between the mobile craft's own position of the detected strike report from the position of the intersection point based on the common frame of reference.

43. The method in accordance with claim 41 including the steps of:

providing a range estimated signal of the detected lightning strike form the mobile craft's own position;

including in each strike report a range estimate signal uncertainty and a bearing signal uncertainty in the form of an area error ellipse;

reducing the area of error ellipses of two correlated strike reports to within the overlapping areas thereof surrounding the point of intersection of their LOP's, thereby reducing the uncertainty in range and bearing of the common lightning strike.

* * * * *